United States Patent

[11] 3,615,876

[72] Inventors Roger A. Cowley
Deep River, Ontario, Canada;
Gerald Dolling, Oak Ridge National Laboratory, Oak Ridge, Tenn.; William W. Cochran; Godfrey S. Pawley, Edinburgh, Scotland; Issai Lefkowitz, Princeton, N.J.

[21] Appl. No. 870,755
[22] Filed Sept. 16, 1969
[23] Division of Ser. No. 665,208, Aug. 30, 1967, Pat. No. 3,514,677
[45] Patented Oct. 26, 1971
[73] Assignee The United States of America as represented by the Secretary of the Army
[32] Priority Sept. 14, 1966
[33] Canada
[31] 970,302

[54] SEMICONDUCTING FERROELECTRIC TRANSDUCERS
4 Claims, 7 Drawing Figs.

[52] U.S. Cl. 148/1.5, 29/25.35, 317/235 M, 317/237, 317/241, 317/262 F
[51] Int. Cl. H01l 7/62
[50] Field of Search 148/1.5; 317/237, 235 M, 241, 262 F; 29/25.35

[56] References Cited

UNITED STATES PATENTS

| | | | |
|---|---|---|---|
| 1,711,974 | 5/1929 | Snelling | 317/237 |
| 2,244,741 | 6/1941 | Tovar | 317/241 |
| 3,108,211 | 10/1963 | Allemau et al. | 317/262 |
| 3,157,835 | 11/1964 | Cirkler | 317/262 |

*Primary Examiner*—L. Dewayne Rutledge
*Assistant Examiner*—R. A. Lester
*Attorneys*—Harry M. Saragovitz, Edward J. Kelly, Herbert Berl and Stanley Dubroff

ABSTRACT: New ferroelectric semiconductor materials made of germanium-telluride or an alloy or solid solution of germanium-telluride and tin-telluride, for example, with means for doping said materials to provide regions of differing carrier density, one of said regions having an enhanced piezosensitivity, and methods for manufacturing said semiconductor materials.

*INVENTORS*
BY ROGER A. COWLEY
GERALD DOLLING
WILLIAM W. COCHRAN
GODFREY S. PAWLEY
ISSAI LEFKOWITZ

---- NO CURRENT
—— REVERSE BIAS

INVENTORS,
ROGER A. COWLEY
GERALD DOLLING
WILLIAM W. COCHRAN
GODFREY S. PAWLEY
ISSAI LEFKOWITZ
BY

By: Harry M. Saragovitz, Edward J. Kelly, Herbert Berl & Stanley Dubroff
Attorneys.

INVENTORS,
BY ROGER A. COWLEY
GERALD DOLLING
WILLIAM W. COCHRAN
GODFREY S. PAWLEY
ISSAI LEFKOWITZ
By: Harry M. Saragovitz, Edward J. Kelly, Herbert Berl & Stanley Dubroff
Attorneys.

SEMICONDUCTING FERROELECTRIC TRANSDUCERS

This invention is a divisional application of our copending application Ser. No. 665,208, filed 30 Aug. 1967, for "Semi-Conducting Ferroelectric Transducers, " now U.S. Pat. No. 3,514,677 and relates to ferroelectric semiconductors.

It is commonly known in the art today that ferroelectrics are materials which exhibit the piezoelectric effect. Such materials are characterized by their ability to transforms electrical energy into mechanical energy or reverse the energy transformation by converting mechanical energy into electrical energy. Such devices are used as transducers for sonar; ultrasonic cleaning, cutting and inspection; microphones; phonograph cartridge.elements; accelerometers, strain gauges, etc. When used as transducers converting mechanical energy to electrical energy, the resultant electrical pulses are weak. As a result, an amplifying device must be located reasonably near the transducer to amplify the signal. Furthermore, since the materials are insulators they have high resistivities of $10^{12}$ ohms-cm. and the electrical impedance of the material is very high. In some instances, a cathode follower is used to convert the high-impedance signal to low impedance so that the transmission loss may be reduced. Whatever configuration is used, a device of greater bulk and complexity results than would be preferred.

It has been found that certain diatomic compounds of elements in the 4*a* and 6*a* groups in the periodic table exhibit ferroelectric behavior. Moreover, these compounds have very low conduction band energy levels, around 0.3 electron volts. As a result of both properties these compounds exhibit both the piezoelectric effect and semiconductor properties simultaneously such that mechanical excitation creates an electric field within the compound, which may then be used to give either a nonlinear or amplified signal in a manner similar to that hitherto known for semiconductors. These composite devices may conveniently be called semiconducting ferroelectrics or ferroelectric semiconductors.

As a result, the invention contemplates a ferroelectric semiconductor composed of a material, the elements of which are selected from the 4*a* and 6*a* groups of the periodic table and especially those elements having atomic numbers greater than 16, which may be suitably doped to produce regions of differing carrier density, one of such regions having an enhanced piezosensitivity. The invention also contemplates that a region of carrier density be a donor region or an acceptor region. While the invention will be described using germanium-telluride or an alloy or solid solution of germanium-telluride and tin-telluride, it will be understood that elements comprising the 4*a* and 6*a* groups of the periodic table may be used advantageously in our invention. The invention further contemplates means for mechanically stressing the material to produce an inherently amplified electrical signal across the regions.

The invention additionally contemplates a method of manufacturing the ferroelectric semiconductor comprising the steps of purifying a material composed of elements selected from the 4*a* and 6*a* groups of the periodic table, then doping the material to produce regions of carrier density, then polarizing one of said regions to establish a remanent polarization therein.

The embodiments of the invention will be described by way of example, reference being made to the following drawings wherein.

Figure 1:
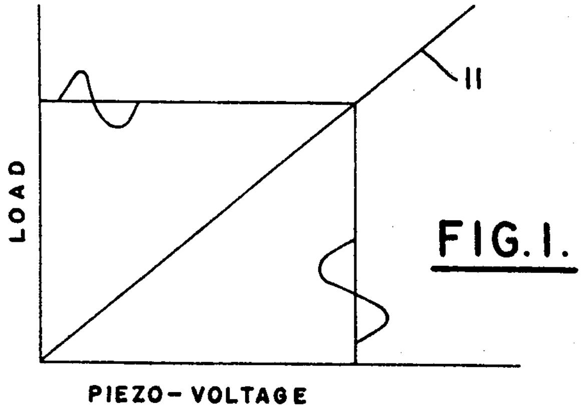
FIG. 1 is a load voltage characteristic diagram for a typical ferroelectric device.

Referring to FIG. 1, curve 11 represents the almost linear relationship which exists between the mechanical load (stress applied) and the piezoelectric voltage detectable across the face of an insulating ferroelectric when the ferroelectric is strained.

Figure 2:
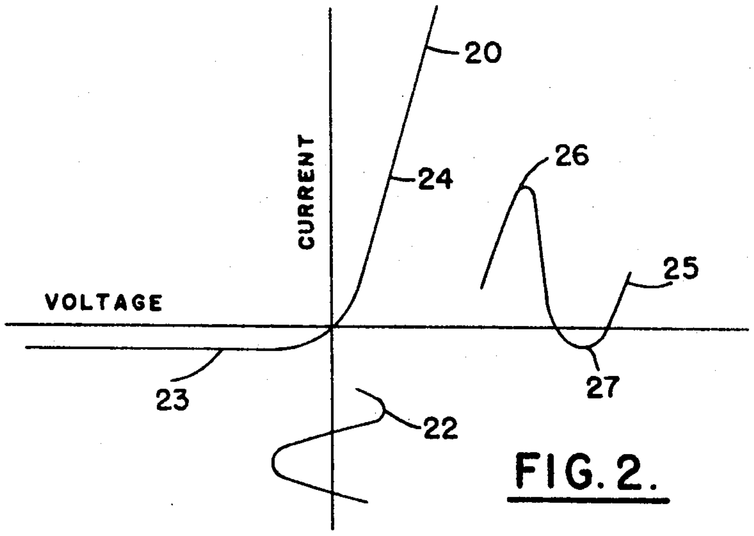
FIG. 2 is a typical current voltage characteristic chart for a semiconducting PN junction.

Referring to FIG. 2, curve 20 is the voltage-current (E-I) characteristic of a typical semiconductor PN junction. The nonlinearity arises because an input voltage variation 22 between points 23 and 24 results in a current 25 having maxima and minima 26 and 27.

In crystals of alloys of germanium-telluride with tin-telluride, or in crystals of germanium-telluride, both these effects (described under FIGS. 1 and 2) may be observed. This results in a current-piezoelectric voltage relationship illustrated by curve 30 in FIG. 3. The figure shows very nonlinear response of the junction to the piezovoltage, particularly if the junction is biased. There is little response until the piezovoltage is equal to the bias voltage and then a rapid increase in the current. These are desirable characteristics for some applications.

All ferroelectrics when subjected to mechanical stress exhibit the piezoelectric effect; that is, a polarizing voltage is created across the crystal. This polarizing voltage which itself sustains an internal electric field within the crystal is a maximum when the ferroelectric has a high resistance. Generally the higher the piezoelectric coefficient the greater the polarizing voltage for a given stress.

Figure 4:
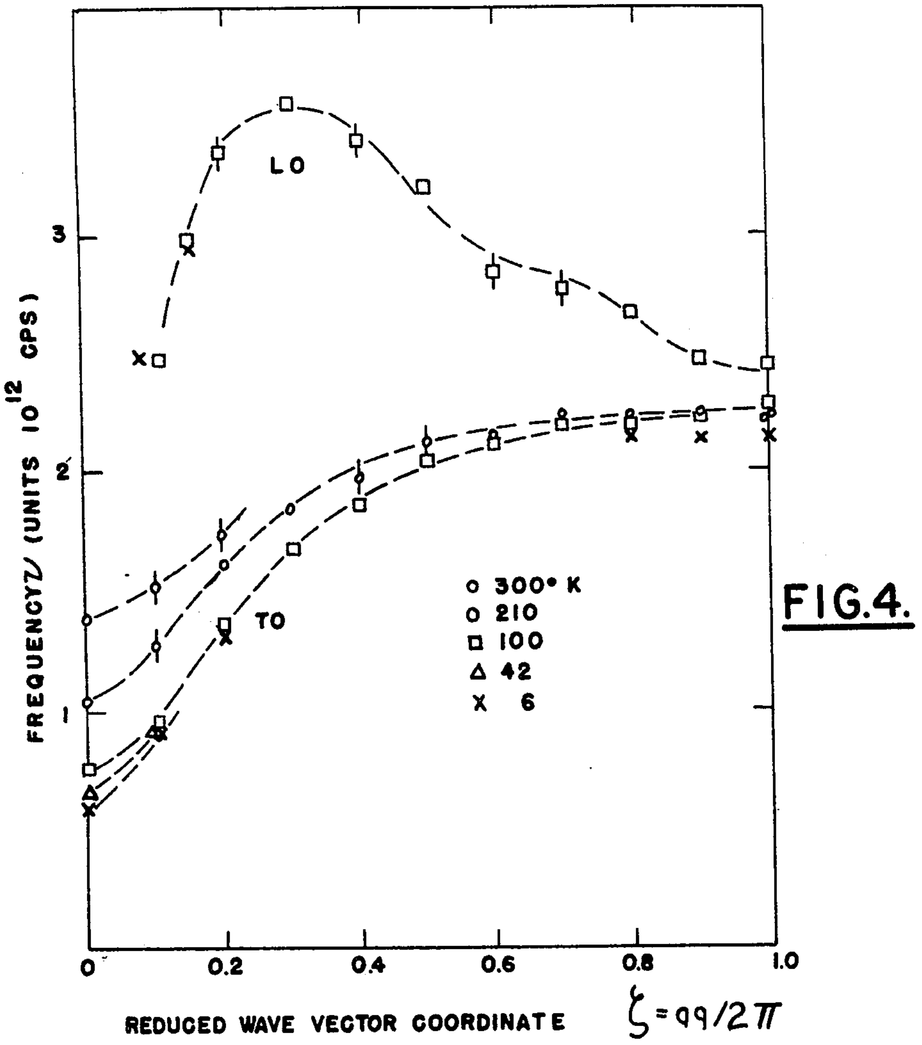
FIG. 4 is a graph of the phonon frequency as a function of the optic branch wave vectors for tin-telluride at various temperatures.

In order to more fully understand the dual properties of semiconducting ferroelectrics contemplated by the invention, it is convenient to refer to certain experimental data which were obtained by the method of inelastic neutron scattering as described by B. N. Brockhouse in *Inelastic Scattering of Neutrons in Solids and Liquids* published by the International Atomic Energy Agency, Vienna (1961). Referring to FIG. 4, the phonon frequencies $\nu_j(\underline{q})$ for the optic branches for wave vectors in the (001) direction at a number of temperatures as given is noted, namely, 300° K., 210° K., 100° K., 42° K. and 6° K.

It will be noted that the transverse optic (T.O.) branch is very temperature dependent, in contrast to the weak temperature dependence of the other branches of the dispersion relation.

Figure 5:
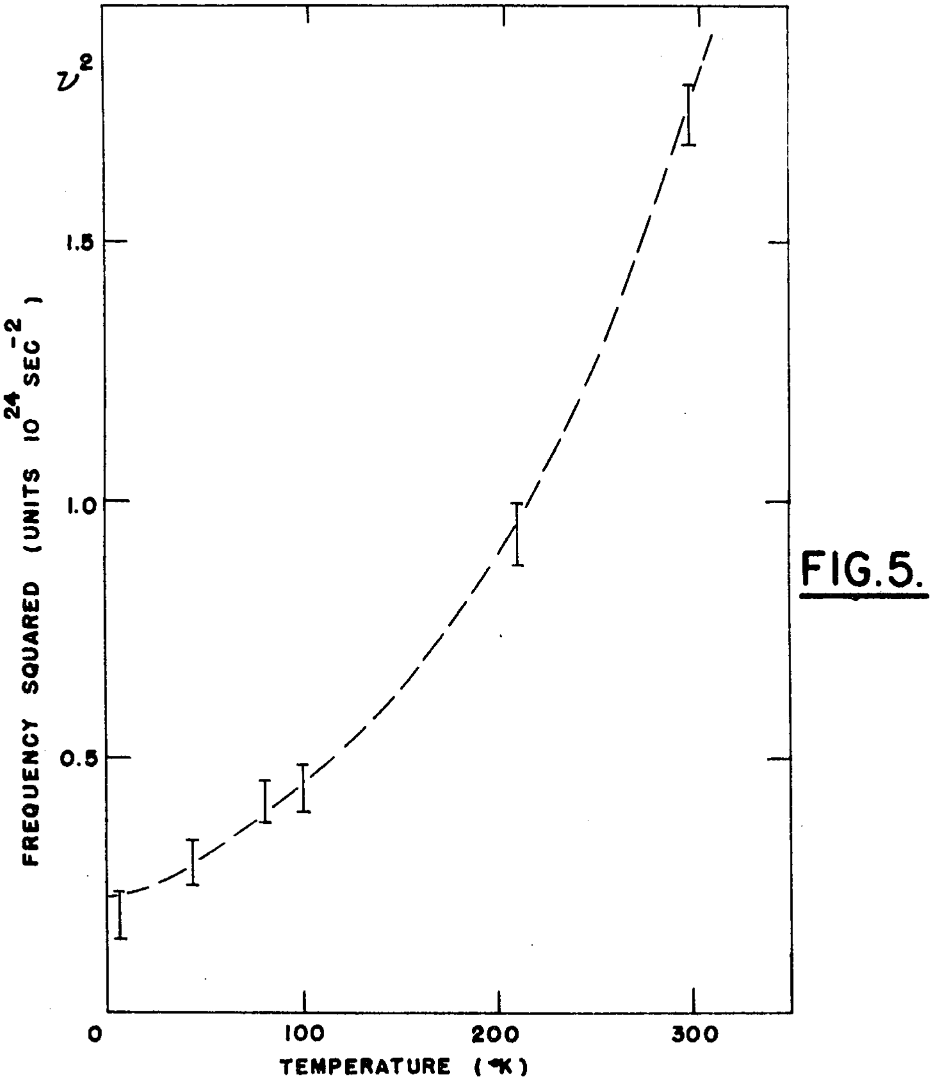
FIG. 5 is a graph of the square of the frequency of the transverse optic mode as a function of temperature.

Referring to FIG. 5, the square of the frequency of the T.O. mode at small wave vector $\underline{q}$, as a function of temperature is given. The bars indicate uncertainty due mainly to the difficulty of correcting these particular measurements for the effect of the finite resolution of the triple-axis spectrometer used to obtain the results.

It is evident from the results of FIG. 4 that as $\underline{q}$ approaches zero the frequency of the longitudinal optic (L.O.) mode falls sharply. This effect may be theoretically understood in terms of the screening of the L.O. mode by carriers in the conduction band, using the theories of Cowley and Dolling as noted in Physical Review Letters, Volume 14, page 549, 1965, and that of Varga, Physical Review, Volume 137, page A1896, 1965, but is not of primary concern here. The estimated value of $\nu$(L.O.) $(\underline{q}\rightarrow 0)$ after allowance for this effect is $(4.2\pm 0.2)\times 10^{12}$ cps. The application of the Lyddane-Sachs-Teller relation then gives $\epsilon(0)=1200\pm 200$ at 100° K.

It is believed that the shape of the T.O. branch of the dispersion curves is an intrinsic property of tin-telluride. It is qualitatively similar to that of lead-telluride although for this material the temperature dependence of $\nu$(T.O.) $(\underline{q}\rightarrow 0)$ is comparatively small. Both the shape of the curves of tin-telluride and its temperature dependence resembles that of the T.O. mode of strontium-titanate although in the latter material the variation of the squared frequency is nearly linear with temperature. However, since a linear temperature dependence is a high-temperature approximation it is to be expected that deviations will occur at low temperatures. The relation of this mode to the dielectric properties of a material has been discussed and it is generally accepted that the temperature variation shown in FIG. 5 foreshadows a transition to a ferroelectric phase. Evidently the cubic structure of tin-telluride remains just stable at 0° K. as illustrated in FIG. 5. It is known that germanium-telluride which has the sodium chloride structure above about 670° K. has a trigonally distorted acentric structure below this temperature, the value of the interaxial angle $\alpha$ being 88.2° at 300° K. and the parameter $x$ which specifies the crystal structure 0.237. For the high-temperature phase, the respective values are $\alpha=90°$ and $x=¼$. Tin-telluride and germanium-telluride form a continuous range of solid solutions, and the transition temperature varies almost linearly with composition. And from experimental results by others, there would appear to be indications that a transition temperature for tin-telluride in the neighborhood of 0° K. occurs which is not inconsistent with the results obtained here. As a result, tin-telluride itself is not a semiconducting ferroelectric.

It is therefore suggested that the transition in germanium-telluride is a displacive transition to a ferroelectric phase, differing from that in certain materials having the perovskite structure, only in that the high conductivity of the germanium-telluride prevents any direct measurement of the dielectric constant.

It has been found therefore that these materials from groups 4*a* and 6*a* of the periodic table exhibit ferroelectric and semiconducting properties. Germanium-telluride as well as alloys of solid solutions of germanium-telluride and tin-telluride exhibit these properties. A solid solution of germanium-telluride and tin-telluride having a molecular percentage of 30 percent germanium-telluride is preferred. Solutions of these diatomic crystals are normally highly conductive, having a carrier density of $10^{20}$ carriers/cubic centimeter. The high conductivity is attributed to the large number of impurities and lack of stoichiometry found in these solutions.

It is evident to those skilled in the art that the inherently high conductivity of ferroelectric semiconductors must be reduced if they are to be useful at frequencies which are reasonably small. The minimum frequency is given approximately by $10^{10}$ divided by the resistivity in ohm. The carrier density must then be reduced to less than about $10^{6}$ carrier oms'3 times the frequency of operation. Therefore in order to operate in the GHs region the carrier density must be reduced to about $10^{15\ 5}$ carriers cms'". This is approximately the intrinsic conductivity of these alloys at room temperature. Modern metallurgical techniques, commonly known in the art, may be used to improve the purity of the crystals and in decreasing the carrier density. Further techniques common to the semiconductor field may be used to dope the crystals into regions of appropriate carrier density by deposition of doping materials or by diffusion of the doping material into the ferroelectric. Further reduction of the carrier concentration might be achieved by cooling of the material, or by use of the properties of PN junctions. The polarization of the single crystal material can be achieved by applying an electric field.

An alternative to the use of single crystal material is to disperse the polycrystalline form in a glass or ceramic matrix. The material is purified in the manner known in the art and regions of the appropriate carrier density created by impurity diffusion. The materials are then heated above the Curie temperature and cooled within the matrix by applying an electric field throughout the cooling process. The material then has a large piezoelectric coefficient at room temperature and may have the advantage of higher resistivity than the single crystal material. Electrodes may then be attached to either the single crystal or polycrystalline material.

Figure 3:
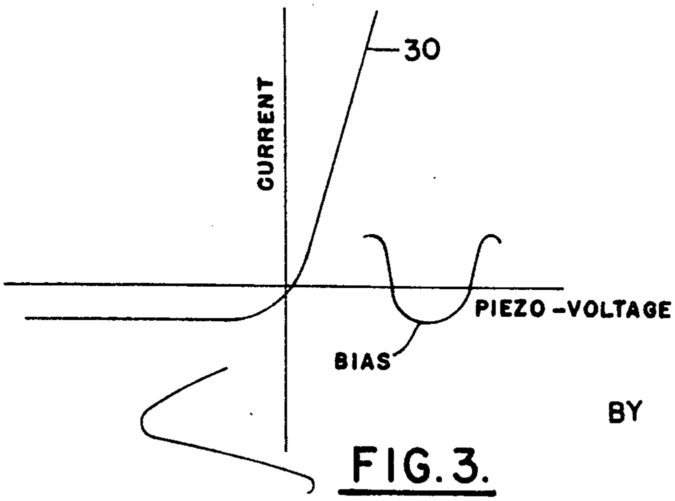
FIG. 3 is a typical current voltage characteristic chart for a ferroelectric semiconductor junction.
Figure 6:
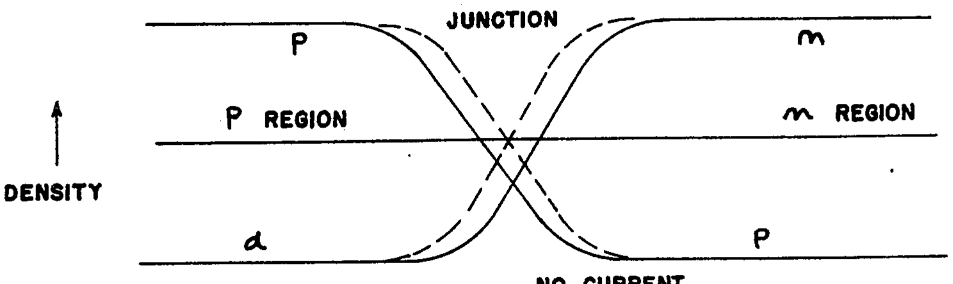
FIG. 6 is a schematic diagram of the concentration distribution across PN junction in both a zero and reverse bias state.

The carrier concentration across a PN junction is shown in FIG. 6, The effect of applying a stress to the junction is to create a field across it which will alter the resistance of the junction appreciably. A particularly useful feature is shown if the junction is reverse biased. The carrier concentration at the junction is then appreciably lower than the intrinsic carrier concentration, which makes the purification easier and also enables the device to operate at lower frequencies. The current output is then however very nonlinear, as shown in FIG. 3.

Figure 7:
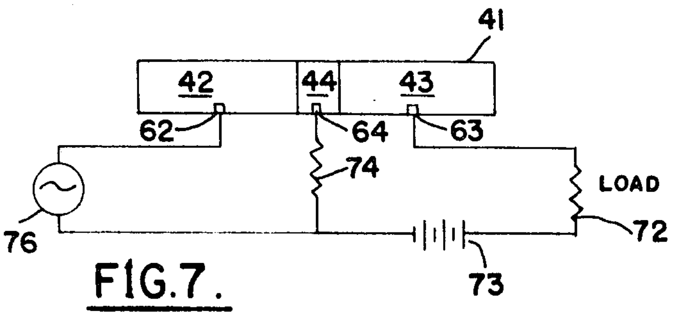
FIG. 7 is a schematic diagram of an NPN transistor in which the stress is applied to the emitter junction giving rise to an amplified signal at the collector.

As will now be apparent to those knowledgeable in the art, a three-terminal NPN device will enable the signal from one stressed PN junction to be amplified provided the second one is within the carrier diffusion length of the first, as shown in FIG. 7 wherein numerals 42, 43, and 44 designate the principal elements of an NPN transistor made from materials described herein above. Numerals 62, 64 and 63 designate the connections to these elements. A generator source, source, internal or external, is shown at 76 and standard circuit elements used in the application of transistors are shown at 72, 73, and 74.

In practice, a stress applied to the combined system alters the carrier concentration associated with the emitter junction 42 to 44 or 44 to 43 which considerably changes the current in the collector junction 42 to 44 or 44 to 43 giving voltage amplification, in the same manner as with an NPN transistor. Clearly more complex systems with yet more different regions are embraced within the scope of this invention.

An alternative way in which these materials may be used as amplifiers is by using the technique demonstrated by Hutson, McFee and White (Physical Review Letters 7, 237(1969)).A steady electric field is applied along the length of the piezoelectric material and then an acoustic wave may be amplified if the drift velocity of the carrier is slightly greater than that of the acoustic waves. The advantage of these materials over the more normally used cadmium sulfide and zinc-oxide would be in their larger piezoelectric coefficient. The difficulty however is to reduce the carrier concentration sufficiently to enable the frequency of operation to be low enough to be useful.

We claim:

A method of manufacturing a ferroelectric semiconductor comprising the steps of purifying a material composed of elements selected from the group of the periodic table consisting of 4*a* and 6*a*, doping the material to produce regions of varying carrier density, and polarizing one of said regions to establish a remanent polarization therein.

2. A method of manufacturing a ferroelectric semiconductor comprising the steps of selecting a body from the group consisting of intrinsic germanium-telluride and a solid solution of intrinsic germanium-telluride with intrinsic tin-telluride, creating donor and acceptor regions within said body, and polarizing one of said regions to produce a region of enhanced piezosensitivity.

3. The method of claim 2 wherein the step of polarizing one of said regions comprises the steps of subjecting said region to a high-intensity electric field, and then cooling said region in the presence of the high electric field through its Curie point to about room temperature.

4. A method of manufacturing a ferroelectric semiconductor comprising the step of selecting a single crystal from the group of crystals consisting of intrinsic germanium-telluride and a solid solution of intrinsic germanium-telluride with intrinsic tin-telluride, creating donor and acceptor regions therein, subjecting one of said regions to a high-intensity electric field such that said region possess an enhanced piezosensitivity.